US010268246B2

(12) United States Patent
Uehara (10) Patent No.: US 10,268,246 B2
(45) Date of Patent: Apr. 23, 2019

(54) DISK APPARATUS INCLUDING BASE WITH PROTRUDING CONTACT PORTIONS FOR COVER ATTACHMENT

(71) Applicant: KABUSHIKI KAISHA TOSHIBA, Tokyo (JP)

(72) Inventor: Manabu Uehara, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/694,954

(22) Filed: Sep. 4, 2017

(65) Prior Publication Data
US 2018/0275727 A1 Sep. 27, 2018

(30) Foreign Application Priority Data
Mar. 23, 2017 (JP) ................................. 2017-057106

(51) Int. Cl.
*G06F 1/18* (2006.01)
*G11B 25/04* (2006.01)
*G11B 33/14* (2006.01)

(52) U.S. Cl.
CPC ............ *G06F 1/187* (2013.01); *G11B 25/043* (2013.01); *G11B 33/1446* (2013.01); *G11B 33/1493* (2013.01); *G11B 33/14* (2013.01)

(58) Field of Classification Search
CPC ............................... G06F 1/187; G11B 25/043
See application file for complete search history.

(56) References Cited

U.S. PATENT DOCUMENTS

| | | | | |
|---|---|---|---|---|
| 6,307,712 | B1 * | 10/2001 | Meguro | G11B 23/0302 360/133 |
| 6,490,137 | B1 * | 12/2002 | Toyota | C08G 18/5015 360/135 |
| 7,209,317 | B1 | 4/2007 | Berding et al. | |
| 7,787,213 | B1 * | 8/2010 | Michael | G11B 33/148 360/97.13 |
| 8,587,896 | B1 * | 11/2013 | Ishino | G11B 19/2009 310/71 |
| 8,797,679 | B1 * | 8/2014 | Rosner | G11B 25/043 360/99.2 |
| 9,711,187 | B1 * | 7/2017 | Okamoto | G11B 33/1446 |
| 2002/0131207 | A1 * | 9/2002 | Oishi | G11B 23/0308 360/133 |

(Continued)

FOREIGN PATENT DOCUMENTS
JP H02278592 A 11/1990

*Primary Examiner* — Binh B Tran
*Assistant Examiner* — Douglas R Burtner
(74) *Attorney, Agent, or Firm* — Kim & Stewart LLP (57) ABSTRACT

A disk apparatus includes a base including a bottom wall, a sidewall provided along a peripheral portion of the bottom wall, and a plurality of corner portions, a painted surface formed on at least an inner surface of the base, a plate-like cover attached to the base, the cover including an edge surface and a plurality of corner portions facing an inner surface of the base, and a rotatable recording medium disposed between the base and the cover. The sidewall of the base includes a plurality of protruding portions that are each disposed at a position corresponding to one of the corner portions of the cover and includes a contact surface configured to contact the edge surface of the cover.

18 Claims, 5 Drawing Sheets

(56) References Cited

U.S. PATENT DOCUMENTS

| | | | | |
|---|---|---|---|---|
| 2003/0235032 A1* | 12/2003 | Lee | G06F 1/184 | 361/679.57 |
| 2007/0008697 A1* | 1/2007 | Choi | G11B 25/043 | 361/679.36 |
| 2009/0222125 A1* | 9/2009 | Ikegawa | G11B 19/2009 | 700/110 |
| 2009/0241322 A1* | 10/2009 | Uefune | G11B 25/043 | 29/603.01 |
| 2011/0038076 A1* | 2/2011 | Hayakawa | G11B 25/043 | 360/97.16 |
| 2011/0122567 A1* | 5/2011 | Cheah | G11B 25/043 | 361/679.33 |
| 2011/0212281 A1* | 9/2011 | Jacoby | G11B 25/043 | 428/35.8 |
| 2012/0257302 A1* | 10/2012 | Kwon | G11B 25/043 | 360/97.16 |
| 2012/0275287 A1* | 11/2012 | McGuire, Jr. | G11B 25/043 | 369/75.11 |
| 2013/0033780 A1* | 2/2013 | Jeon | G11B 25/043 | 360/75 |
| 2013/0155603 A1 | 6/2013 | Kaneko et al. | | |
| 2013/0170074 A1* | 7/2013 | Hayakawa | G11B 33/148 | 360/97.22 |
| 2013/0235488 A1* | 9/2013 | Andrikowich | G11B 33/1486 | 360/97.22 |
| 2015/0294691 A1* | 10/2015 | Inaba | G11B 5/84 | 360/97.22 |
| 2015/0332733 A1* | 11/2015 | Lapp | H02K 5/12 | 360/99.08 |

* cited by examiner

DISK APPARATUS INCLUDING BASE WITH PROTRUDING CONTACT PORTIONS FOR COVER ATTACHMENT

CROSS-REFERENCE TO RELATED APPLICATION

This application is based upon and claims the benefit of priority from Japanese Patent Application No. 2017-057106, filed Mar. 23, 2017, the entire contents of which are incorporated herein by reference.

FIELD

Embodiments described herein relate generally to a disk apparatus.

BACKGROUND

A magnetic disk drive, which serves as a disk apparatus, includes a casing having a base and a top cover, and an actuator supporting a rotatable magnetic disk, a magnetic head, and the like, are disposed within this casing. The base is formed from a metallic material such as aluminum, and a black electro-paint, for example, is applied onto inner and outer surfaces of the base.

In assembling such a magnetic disk drive, when the top cover is attached to the base, corner portions of the top cover contact the inner surface of the base. Consequently, the inner surface of the base is often scratched (and wear tracks are left) or the electro-paint peels off and such peeling is often recognized as scratches. When the base and the top cover each include a plurality of corner portions, the occurrence of the above scratches tends to be concentrated near the corner portions of the base. When the scratches or the peeling of the electro-paint occurs, the base is often determined as a manufacturing failure. As a result, there is a risk of reduced manufacturing yield and increased of manufacturing cost.

DETAILED DESCRIPTION

Embodiments provide a disk apparatus that does not suffer from a scratched base or paint peeling off the base, thereby improving manufacturing yield and reducing manufacturing cost of the disk apparatus.

In general, according to one embodiment, a disk apparatus includes a base including a bottom wall, a sidewall provided along a peripheral portion of the bottom wall, and a plurality of corner portions, a painted surface formed on at least an inner surface of the base, a plate-like cover attached to the base, the cover including an edge surface and a plurality of corner portions facing an inner surface of the base, and a rotatable recording medium disposed between the base and the cover. The sidewall of the base includes a plurality of protruding portions that are each disposed at a position corresponding to one of the corner portions of the cover and includes a contact surface configured to contact an edge surface of the cover.

A disk apparatus according to an embodiment will be described hereinafter with reference to the drawings.

It is noted that the disclosure is presented by way of example only and matters which can be changed as appropriate without departing from the spirit of the disclosure and which could easily be conceived of fall within the scope of the present disclosure. Moreover, the drawings are often illustrated schematically in widths, thicknesses, shapes, and the like, of constituent elements as compared with actual implementation for clarity of explanation. However, the drawings are presented by way of example only and are not intended to limit the reading of the present disclosure. Furthermore, in the specification and the drawings, similar elements to those already described with reference to the drawings are denoted by the same reference numbers and are often not described in detail when appropriate.

Embodiment

Figure 1:
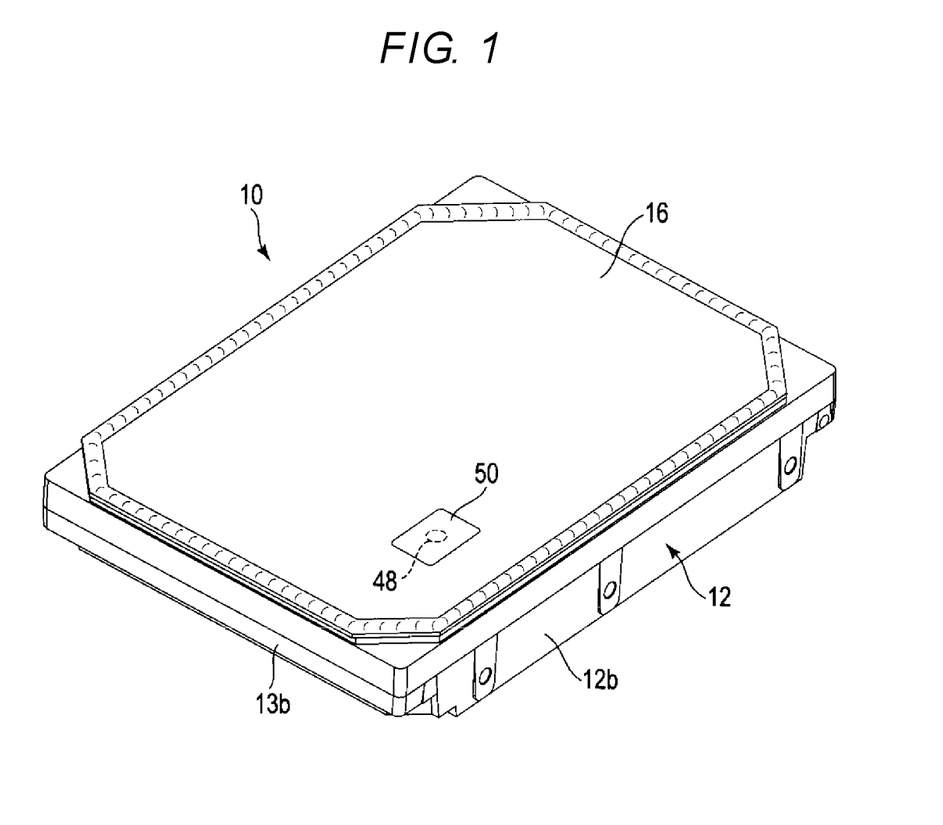
FIG. 1 is a perspective view illustrating a hard disk drive (HDD) according to an embodiment.

A hard disk drive (HDD) serving as a disk apparatus according to an embodiment will be described in detail. FIG. 1 is a perspective view illustrating an appearance of the HDD according to the embodiment, and FIGS. 2 and 3 are exploded perspective views illustrating the HDD in an exploded fashion.

Figure 2:
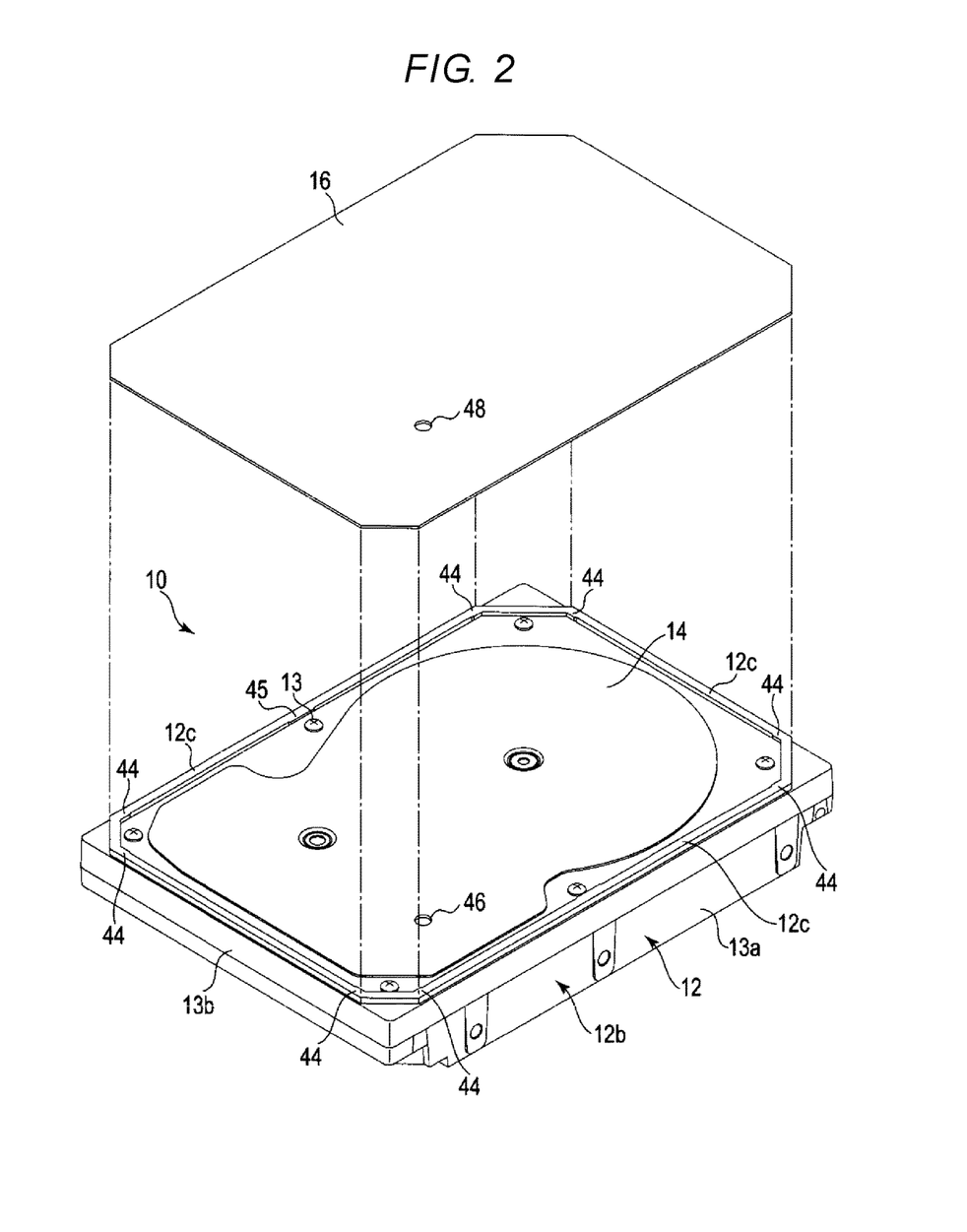
FIG. 2 is an exploded perspective view of the HDD illustrating a top cover in an exploded fashion.
Figure 3:
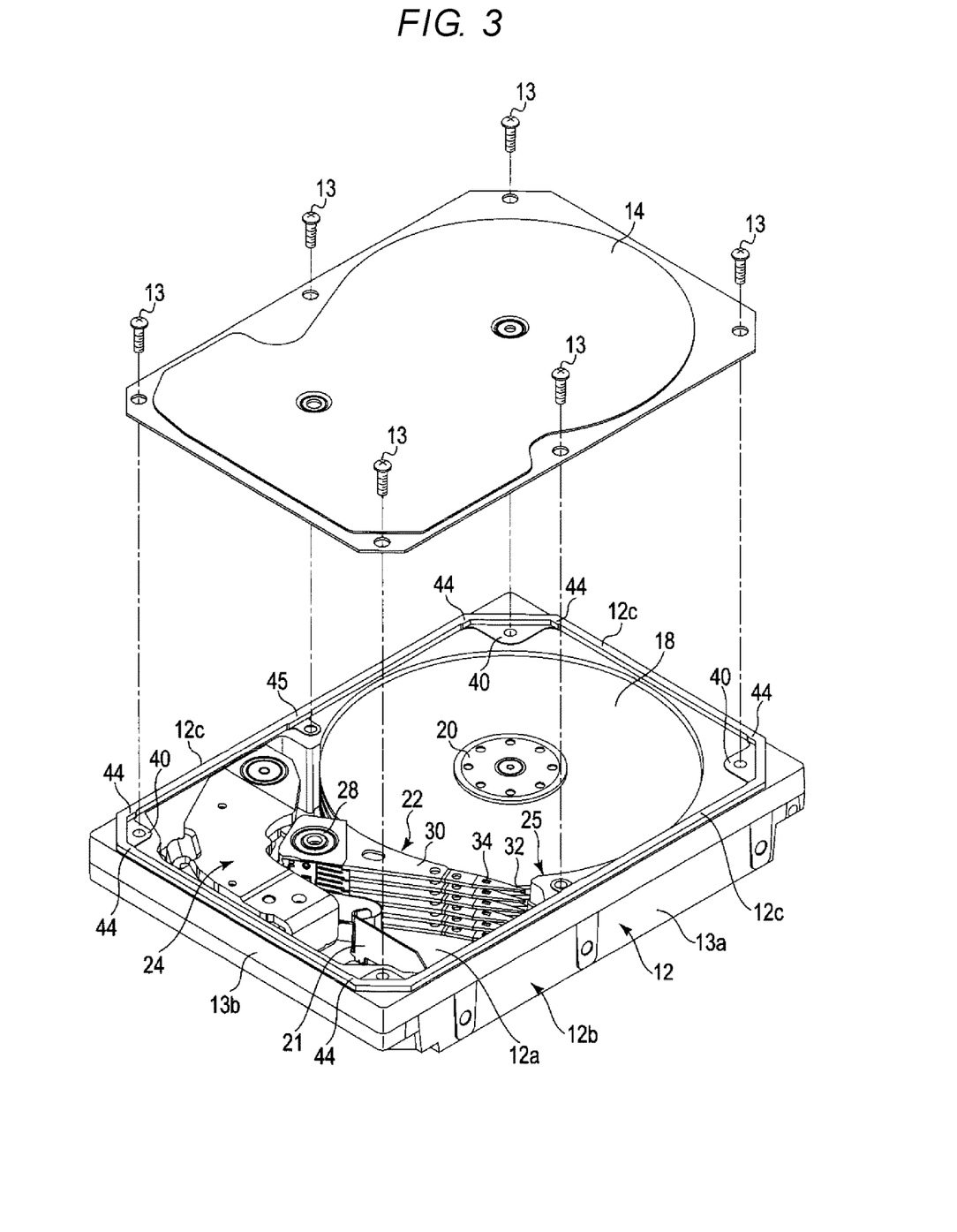
FIG. 3 is an exploded perspective view of the HDD illustrating an inner cover in an exploded fashion.

As shown in FIGS. 1 to 3, the HDD includes a flat and generally rectangular casing 10. This casing 10 includes a rectangular box-like base 12 having an open upper surface, an inner cover 14 screwed on the base 12 by a plurality of screws 13 and closing an upper end opening of the base 12, and an outer cover (top cover) 16 superimposed on the inner cover 14 with a peripheral portion thereof welded to the base 12. The base 12 includes a rectangular bottom wall 12a that faces the inner cover 14 with a gap therebetween, and a sidewall 12b formed along a periphery of the bottom wall 12a. The bottom wall 12a and the sidewall 12b are formed from, for example, aluminum. The sidewall 12b includes a pair of long side walls 13a facing each other and a pair of short side walls 13b facing each other. A roughly rectangular fixed rib 12c is disposed on and protrudes from an upper end surface of the sidewall 12b. In some embodiments, the fixed rib 12c can be molded integrally with the sidewall 12b and, in such embodiments, constitutes an integral part of the sidewall 12b. In the present embodiment, the fixed rib 12c except for protruding portions, to be described later, is formed to have a constant cross-sectional width and a constant cross-sectional height. The base 12 has four corner portions. Furthermore, the fixed rib 12c has four corner portions corresponding to the corner portions of the base 12, and each corner portion of the fixed rib 12c is chamfered to constitute two corners. The fixed rib 12c has thereby eight corners in all.

The inner cover 14 is formed from, for example, stainless steel and formed into a substantially rectangular shape. Specifically, the inner cover 14 has a shape and dimensions corresponding to those of the fixed rib 12c of the base 12. That is, the four corner portions of the inner cover 14 are also chamfered, so that the inner cover 14 is formed into the roughly rectangular shape having eight total corners in all.

In addition, the inner cover 14 is configured with an outer dimension slightly smaller than an inner dimension of the fixed rib 12c.

The inner cover 14 is disposed on the sidewall 12b of the base 12 inside of the fixed rib 12c. A plurality of parts of a peripheral portion of the inner cover 14, for example, the four corner portions and central portions of long sides, are screwed onto an upper surface of the sidewall 12b of the base 12 by the screws 13. The inner cover 14 thereby closes the upper end opening of the base 12. A side edge (edge surface) of the inner cover 14 faces an inner side surface of the fixed rib 22c with a slight gap therebetween.

It is noted that the fixed rib 12c is formed such that the height thereof is greater than a thickness of the inner cover 14. As shown in FIG. 2, when the inner cover 14 is attached to the base 12, the fixed rib 12c protrudes upward beyond the inner cover 14.

As shown in FIGS. 1 and 2, the outer cover 16 is formed from, for example, aluminum, and formed into a rectangular shape. The outer cover 16 has a shape and dimensions corresponding to those of the fixed rib 12c. Four corner portions of the outer cover 16 are chamfered, so that the outer cover 16 is formed into a roughly rectangular shape having eight corners in all and configured with an outer dimension approximately equal to an outer dimension of the fixed rib 12c. That is, the outer cover 16 is formed to have width and length dimensions slightly larger than that of the inner cover 14, so that the outer cover 16 can be disposed on the fixed rib 12c and thereby cover the inner cover 14. The peripheral portion of the outer cover 16 is welded to the fixed rib 12c over an entire periphery and fixed in an airtight fashion to the fixed rib 12c.

Vent holes 46 and 48 that penetrate the casing 10 are formed in the inner cover 14 and the outer cover 16, respectively. During manufacture of the HDD, air within the casing 10 is exhausted through the vent holes 46 and 48, and furthermore, low-density gas, for example, helium gas lower in density than air is introduced into the casing 10 through these vent holes 46 and 48. A seal 52, for example, is bonded onto an outer surface of the outer cover 16 to close the vent hole 48.

As shown in FIG. 3, a plurality of magnetic disks 18 serving as recording media and a spindle motor 20 serving as a drive unit that supports and rotates the magnetic disks 18 are disposed within the casing 10. The spindle motor 20 is disposed on the bottom wall 12a. Each magnetic disk 18 is configured with a diameter of, for example, 95 mm, and has a magnetic recording layer on an upper surface and/or a lower surface thereof. Each magnetic disk 18 is coaxially fitted into a hub (not shown) of the spindle motor 20, clamped by a clamp spring (not shown), and fixed to the hub. Each magnetic disk 18 is thereby positioned parallel to the bottom wall 12a of the base 12. In addition, each magnetic disk 18 is rotated at a predetermined rotational speed by the spindle motor 20.

While the five magnetic disks 18, for example, are accommodated in the casing 10 in the present embodiment as shown in FIG. 3, the number of the magnetic disks 18 is not limited to five. Alternatively, a single magnetic disk 18 may be disposed within the casing 10.

Also disposed within the casing 10 is a plurality of magnetic heads 32 for recording information to and reading information from the magnetic disks 18 and a head stack assembly 22, which supports these magnetic heads 32 in such a manner that the magnetic heads 32 are movable relative to the magnetic disks 18. Furthermore, also provided within the casing 10 are a voice coil motor (hereinafter, referred to as "VCM") 24 for rotating and positioning the head stack assembly 22, a ramp load mechanism 25 holding each magnetic head 32 at an unload position apart from each magnetic disk when the magnetic head 32 moves to an outermost circumference of the magnetic disk 18, and a board unit 21, which includes electronic components such as a conversion connector.

The head stack assembly 22 includes a rotatable bearing unit 28, a plurality of arms 30 extending from the bearing unit 28, and suspensions 34 extending from the respective arms 30. Each magnetic head 32 is supported on a tip end portion of a respective suspension 34.

A printed circuit board (not shown) is screwed on an outer surface of the bottom wall 12a of the base 12. The printed circuit board controls operation of the spindle motor 20 and also the VCM 24 and the magnetic heads 32 via the board unit 21.

Figure 4:
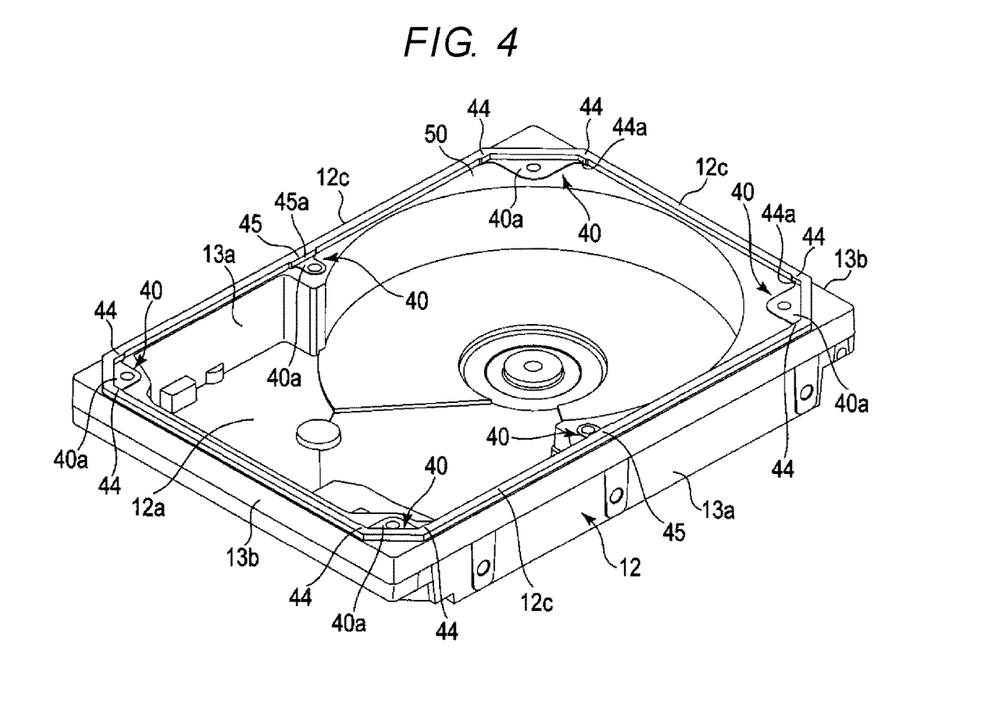
FIG. 4 is a perspective view illustrating a base of the HDD.
Figure 5:
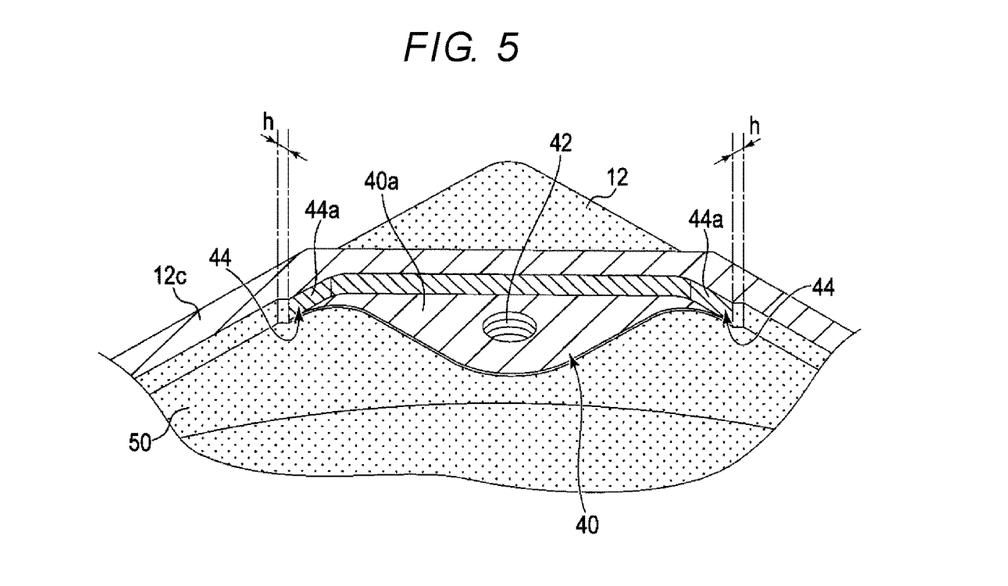
FIG. 5 is a perspective view illustrating one corner portion of the base in an enlarged fashion.

FIG. 4 is a perspective view illustrating the base 12 of the casing 10 with the constituent elements disposed within removed, and FIG. 5 is a perspective view illustrating one corner portion of the base 12 in an enlarged fashion.

As shown in FIGS. 4 and 5, a painted surface 50 is formed with an electro-paint that is applied onto some or most of an inner surface and an outer surface of the base 12, except for an upper surface of the fixed rib 12c. For example, an epoxy resin-based black paint is used as such an electro-paint. In FIG. 5, the painted surface 50 is denoted by the dotted areas.

Seats 40 are respectively disposed at locations corresponding to where the inner cover 14 is screwed down to base 12 on the upper end surface of the sidewall 12b. That is, the seats 40 are formed inside of the fixed rib 12c in the four corner portions of the sidewall 12b and central portions of the long sides of the sidewall 12b. Each seat 40 protrudes slightly upward from (i.e., away from the rectangular bottom wall 12a) the upper end surface of the sidewall 12b. Each seat 40 includes a seating surface 40a machined to be flat and a screw hole 42 is located within this seating surface 40a. The seating surface 40a can be connected to the inner side surface of the fixed rib 12c. By machining the seating surface 40a, the painted surface is removed from the seating surface 40 and a metal surface of a base material of the base 12 is exposed. The seating surfaces 40a of the plurality of seats 40 are machined to be identical in height with high accuracy. The inner cover 14 is placed on the plurality of seating surfaces 40a and screwed onto the seating surfaces 40a, thereby fixing the inner cover 14 to the base 12 without gaps.

The base 12 includes a plurality of protruding portions 44 disposed on a side surface of the sidewall 12b or, in this embodiment, on a side surface of the fixed rib 12c. These protruding portions 44 are formed integrally on the fixed rib 12c and protrude from the inner side surface of the fixed rib 12c in an inward direction of the base 12 (i.e., toward the magnetic disks 18). The protruding portions 44 are disposed near at least one corner portion of the fixed rib 12c. In the present embodiment, the protruding portions 44 are disposed near the eight corner portions of the fixed rib 12c, respectively. Furthermore, in the present embodiment, protruding portions 45 are also disposed near the screwing seats 40 in the central portions of the long sides of the fixed rib 12c, respectively.

Each protruding portion 44 or 45 includes a flat contact surface 44a or 45a that are configured to contact an edge surface of the inner cover 14. The contact surfaces 44a and 45a are each formed generally in parallel to the inner side surface of the fixed rib 12c. By machining the contact surfaces 44a and 45a of at least some of or all of the plurality of protruding portions 44 and 45, the painted surface is removed from the contact surfaces 44a and 45a and the metal surface of the base material of the base 12 is exposed. Furthermore, the contact surfaces 44a and 45a are machined into flat surfaces lower in surface roughness than the surrounding electro-painted surfaces. The surface roughness of the contact surfaces 44a and 45a is set to, for example, about Rz 12.5. In the present embodiment, a protrusion height h of each of the protruding portions 44 and 45, that is, the protrusion distance h from the inner side surface of the fixed rib 12c to each of the contact surfaces 44a and 45a is set to about 0.03 to 0.06 mm. In FIG. 5, the machined contact surfaces 44a and the machined seat 40a are denoted by oblique lines.

In the present embodiment, the contact surfaces 44a of the protruding portions 44 are continuous with the seating surfaces 40a of the seats 40 and the contact surfaces 45a of the protruding portions 45 are continuous with the seating surfaces 40a of the seats 40. That is, the contact surfaces 44a and 45a are formed to be contiguous with the adjacent seating surfaces 40a. With such a configuration, the contact surfaces 44a and 45a can be machined simultaneously with the seating surfaces 40a by cutting tools used to machine the seating surfaces 40. Thus, it is possible to facilitate machining and decrease the number of cutting operations for forming sidewall 12b.

Figure 6:
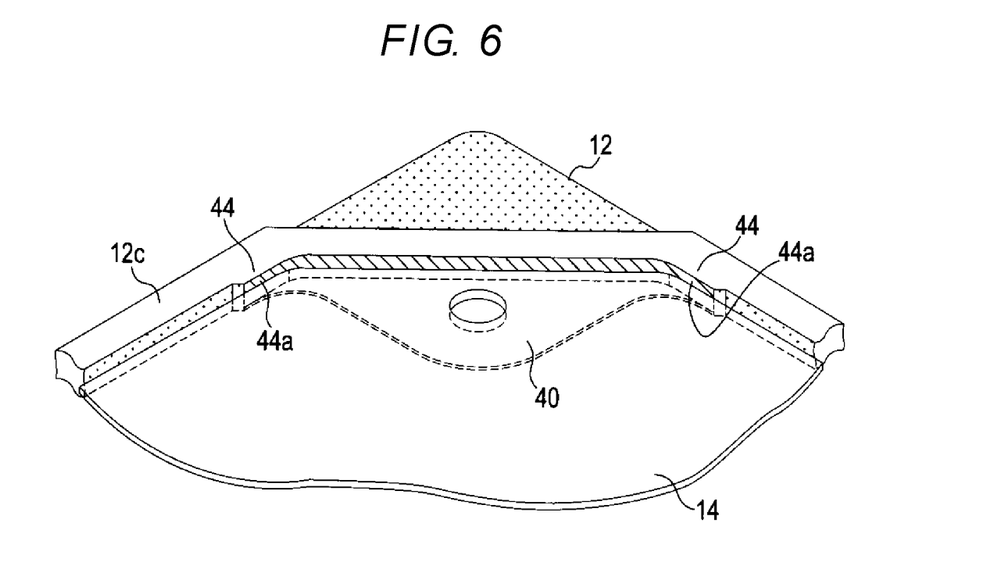
FIG. 6 is a perspective view illustrating the corner portion of the base in an enlarged fashion in a state in which the inner cover is attached to the base.

FIG. 6 is a perspective view illustrating one corner portion of the base 12 with the inner cover 14 attached to the base 12. When the inner cover 14 is disposed at a predetermined position inside of the fixed rib 12c in a conventional HDD, the eight corner portions of the inner cover 14 can readily contact one or more portions of the inner side surface of the fixed rib 12c. According to the present embodiment, the plurality of protruding portions 44 are disposed near the corner portion of the inner side surface of the fixed rib 12c as shown in FIG. 6. Owing to this, when the inner cover 14 is attached to the base 12, each corner portion of the inner cover 14 contacts or abuts onto the contact surface 44a of each protruding portion 44 rather than with the inner side surface of the fixed rib 12c. The inner cover 14 is then positioned at the predetermined position so that the edge surface of the inner cover 14 faces or abuts onto the plurality of contact surfaces 44a.

In this way, with the above configuration, when the inner cover 14 is attached to the base 12, the corner portions of the inner cover 14 do not contact the inner surface of the sidewall 12b or, in this embodiment, on the inner side surface of the fixed rib 12c. Consequently, the painted surface of the inner side surface of the fixed rib 12c is not scratched. Furthermore, the contact portions or side edge portions of the inner cover 14 contact or abut onto the contact surfaces of the protruding portions 44, i.e., contact surfaces 44a and/or 45a. However, because the contact surfaces 44a and 45a are machined surfaces without the electro-paint thereon, any scratches that occur thereon during manufacturing are inconspicuous, even when the side edge portions of the inner cover 14 and the contact surfaces 44a and/or 45a are rubbed against one another during attachment of the inner cover 14 to the base 12. It is thereby possible to decrease the number of manufacturing failures of bases resulting from scratches or peeling of the paint, which improves manufacturing yield of HDDs, and reduces manufacturing cost.

Moreover, the machined surfaces can be, in general, formed with high dimensional accuracy, so that clearances between the inner cover 14 and the protruding portions 44 and 45 can be reduced to about 0.15 mm. Owing to this, after attachment of the inner cover 14, the inner cover 14 can be positioned with high accuracy.

According to the present embodiment configured as described above, it is possible to fabricate a disk apparatus that does not suffer from the base and/or a painted contact surface from being scratched, or from the paint from being peeled off, thereby improving manufacturing yield, and reducing manufacturing cost.

The present disclosure is not limited to the above-mentioned embodiment but the present disclosure can be embodied by modifying the constituent elements without departing from the spirit of the present disclosure in implementation. Furthermore, various embodiments can be realized by combining a plurality of constituent elements disclosed in the above-mentioned embodiment as appropriate. For example, some of the constituent elements may be deleted from all the constituent elements described in the embodiment. Moreover, the constituent elements across the different embodiments may be combined as appropriate.

In the aforementioned embodiment, the protruding portions of the base are provided near all the corner portions; however, the present disclosure is not limited to such an embodiment, and the protruding portions may be provided near at least about two corner portions. Furthermore, each of the above-described protruding portions is not limited to one continuous protruding portion, but may be divided into a plurality of protruding portions. The contact surface of each protruding portion is not limited to the flat surface illustrated, but may be a curved surface. In the disk apparatus, the number of the magnetic disks is not limited to the number described in the embodiment, but can be increased or decreased. A size of the magnetic disks is not limited to 3.5 inches but may be any other size. Materials, shapes, magnitudes, and the like of the constituent elements of the disk apparatus are not limited to those in the above-mentioned embodiment but can be variously changed as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk apparatus, comprising:
   a base having a plurality of corner portions, a bottom wall, and a sidewall disposed along a peripheral portion of the bottom wall between the plurality of corner portions and forming an interior region within the base;
   a painted surface formed on at least an inner surface of the base, the inner surface of the base facing the interior region;
   a cover including an edge surface and a plurality of corner portions facing the inner surface of the base; and
   a rotatable recording medium disposed between the base and the cover, wherein
   the sidewall of the base includes a plurality of protruding portions that are each extending towards the interior region and disposed at a position corresponding to one of the corner portions of the cover, each protruding portion has a contact surface configured to contact the edge surface of the cover, and the contact surface of each protruding portion of the sidewall is a machined surface formed by a machining process.

2. The disk apparatus according to claim 1, wherein
the sidewall of the base includes an upper end surface that faces the cover and a frame-like rib disposed along the upper end surface, and
the cover is disposed on the upper end surface of the sidewall inside of the rib.

3. The disk apparatus according to claim 2, wherein the rib has an inner side surface facing the edge surface of the cover.

4. The disk apparatus according to claim 2, wherein the contact surface of each of the protruding portions is aligned in parallel with an adjacent portion of the inner side surface of the rib, but in a different plane from the adjacent portion of inner side surface of the rib.

5. The disk apparatus according to claim 2, wherein the sidewall of the base includes a plurality of seats formed on the upper end surface, each of the seats includes a machined seating surface, and the cover is in contact with and fixed to each machined seating surface.

6. The disk apparatus according to claim 5, wherein the cover is fixed to each machined seating surface via a screw disposed in a screw hole that passes through the seating surface.

7. The disk apparatus according to claim 5, wherein at least one of the plurality of seats is disposed in a corner portion of the base.

8. The disk apparatus according to claim 7, wherein the machined seating surface of the at least one of the plurality of seats disposed in the corner portion of the base is contiguous with a corresponding protruding portion of the corner portion of the base.

9. The disk apparatus according to claim 5, wherein at least one of the plurality of seats is disposed in a side portion of the base that is between a pair of the plurality of corner portions, and the side portion of the base includes a side protruding portion having a side contact surface that is a machined surface formed by a machining process.

10. The disk apparatus according to claim 4, wherein the contact surface of at least one of the protruding portions is contiguous with an adjacent machined seating surface.

11. The disk apparatus according to claim 10, wherein the contact surface of each of the protruding portions is contiguous with an adjacent seating surface.

12. The disk apparatus according to claim 1, wherein the contact surface has a lower surface roughness than a surface roughness of the painted surface.

13. A disk apparatus, comprising:
a base including a bottom wall, a sidewall disposed along a peripheral portion of the bottom wall, and a plurality of corner portions;
a painted surface formed on at least an inner surface of the base;
a plate-like cover attached to the base, the cover including an edge surface and a plurality of corner portions facing an inner surface of the base; and
a rotatable recording medium disposed between the base and the cover, wherein
the sidewall of the base includes a plurality of protruding portions that are each disposed at a position corresponding to one of the corner portions of the cover and include a contact surface that is aligned in parallel with an adjacent portion of the edge surface of the cover and is configured to contact the edge surface of the cover, wherein
the contact surface has a lower surface roughness than a surface roughness of the painted surface.

14. The disk apparatus according to claim 13, wherein the contact surface is a machined surface formed by a machining process.

15. The disk apparatus according to claim 13, wherein
the sidewall of the base includes an upper end surface that faces the cover and a frame-like rib disposed along the upper end surface and
the cover is disposed on the upper end surface of the sidewall inside of the rib.

16. The disk apparatus according to claim 15, wherein the rib includes an inner side surface facing the edge surface of the cover and the protruding portions are disposed on the inner side surface.

17. The disk apparatus according to claim 15, wherein the contact surface of each of the protruding portions is aligned in parallel with an adjacent portion of the inner side surface of the rib.

18. The disk apparatus according to claim 17, wherein the contact surface of at least one of the protruding portions is contiguous with an adjacent seating surface.

* * * * *